Sept. 18, 1951 M. A. HOLBROOK 2,568,070
COASTING SLED
Filed Jan. 31, 1948
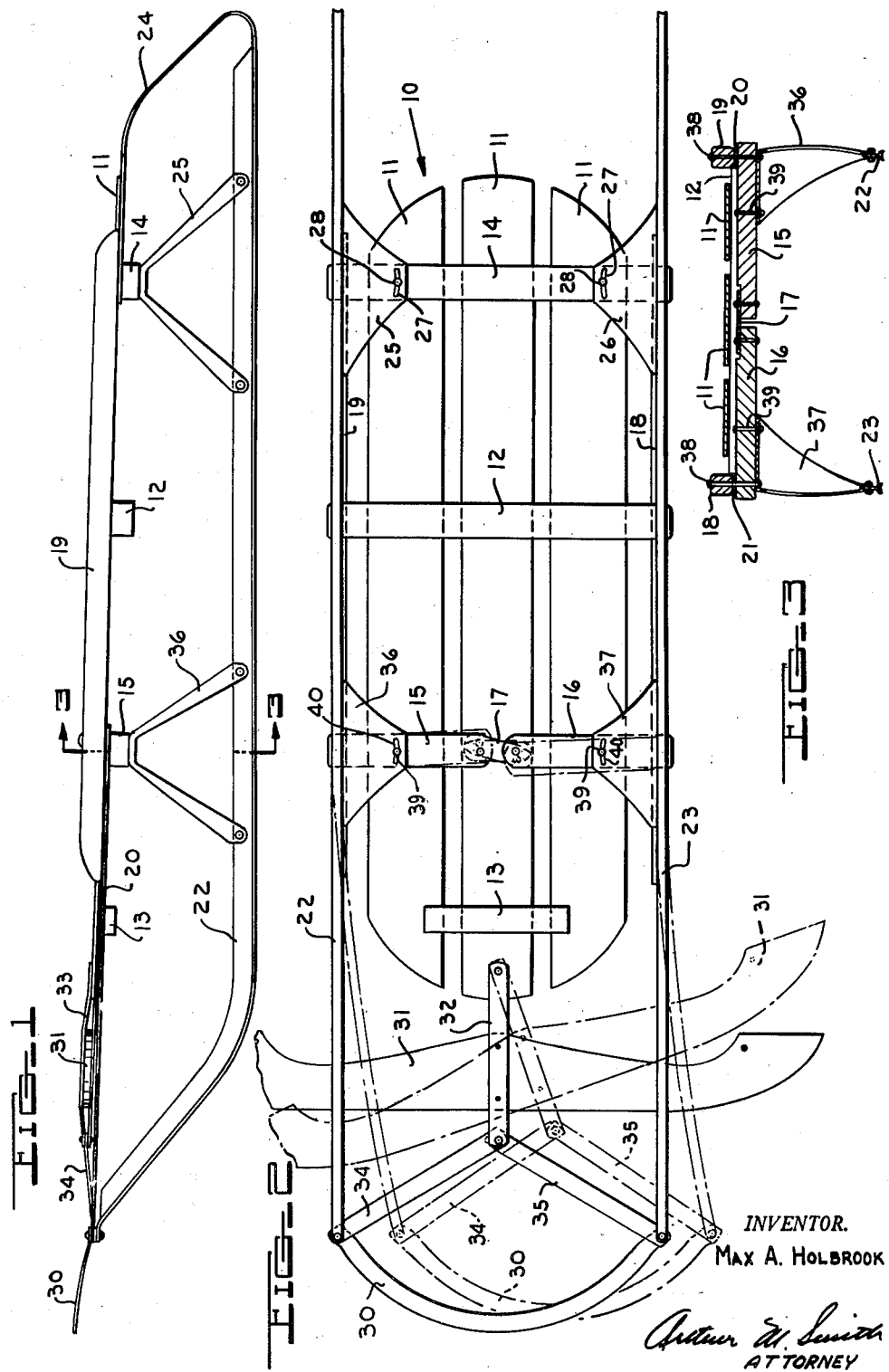
INVENTOR.
Max A. Holbrook
Arthur W. Smith
ATTORNEY Patented Sept. 18, 1951

2,568,070

UNITED STATES PATENT OFFICE 2,568,070

COASTING SLED

Max A. Holbrook, Coldwater, Mich., assignor to Pratt Manufacturing Company, Coldwater, Mich., a limited copartnership Application January 31, 1948, Serial No. 5,630

3 Claims. (Cl. 280—22)

The present invention relates to a coasting sled, and more particularly to a coasting sled having an improved steering action resulting from the novel construction of the forward bolster which permits increased flexing of the forward portions of the sled runner.

An object of the present invention is to provide a steerable coasting sled having a simplified and relatively inexpensive steering mechanism in which the forward portions of the runners are flexed and the forward bolster forming part of the sled structure is so constructed as to assist in the steering movement of the runners.

A further object of the present invention is to provide a coasting sled having continuous flexible runners connected to depending knees which support the sled deck, the forward knee on each runner being connected to a segment of an articulated forward bolster forming a part of the sled deck structure to assist in the steering movement of the sled runners.

Another object of the present invention is to provide a coasting sled in which the steering mechanism has a high mechanical efficiency due to the ratio of the lever arms used and the use of the articulated segments of the forward bolster connected to the forward sled knee to effect a simultaneous steering movement of the runners by flexing the forward ends thereof, the steering mechanism and forward bolster being designed to reduce to a minimum the amount of force required to be applied to the steering bar in order to flex the runners and steer the sled.

A further object of the present invention is to provide a coasting sled which can be easily turned on a relatively short radius with a minimum of steering effort by bowing the forward end of the runners from points adjacent the rear sled knees.

Other objects of this invention will appear in the following description and appended claims, reference being had to the accompanying drawings forming a part of this specification wherein like reference characters designate corresponding parts in the several views.

In the drawings:

Fig. 1 is a side elevation of a sled embodying the essential features of the present invention.

Fig. 2 is a plan view showing the underside of the deck structure and showing a sled embodying the essential features of the present invention. The solid line portions show the relative positions of the parts of the steering mechanism when the sled is moving in a straight line direction. The dotted line portions show the relative positions of the parts of the steering mechanism when said mechanism is moved to turn the sled to the right.

Fig. 3 is a sectional view taken substantially along the line 3—3 of Fig. 1 looking in the direction of the arrows, and showing the articulated forward bolster construction.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A sled construction embodying the present invention comprises a rigid top deck 10 preferably formed of a plurality of rigid spaced slat members 11 which are secured to a forward cleat 13, a central cross-bolster 12 and a rear cross-bolster 14. The articulated front cross-bolster comprises the segments 15 and 16 which are pivotally connected at their spaced adjacent ends by the link 17. The outer ends of the segments 15 and 16 and the ends of the central cross-bolster 12 and the rear cross-bolster 14 are secured to the side rails 18 and 19 of the deck. The front portions of the rails 18 and 19 are connected with forwardly extending steel links 20 and 21 whose forward ends are pivotally connected with the forward ends of a pair of substantially parallel runners 22 and 23 and the arcuate header 30. The runners 22 and 23 are generally T-shaped in cross-section. Each runner has an upturned rear end portion 24 which, as shown in Fig. 1, is secured to the rear ends of the overlying side rails. The runners 22 and 23 are mounted beneath the deck 10 and are attached at each side to the rear knees 25 and 26 secured to the ends of the rear cross-bolster 14 and the side rails 18 and 19 by rivets (not shown) but similar to the long rivets shown in Fig. 3.

Each rear knee 25 and 26 is provided with an arcuate slot 27 through which extends the end of a rivet 28 connected with the rear cross-bolster 14. The ends of the rear knee 25 are suitably secured, as by riveing, to the vertical web of the runner 22 and the ends of the rear knee 26 are similarly secured to the vertical web of the runner 23.

The runners 22 and 23 are each flexible and are pivotally connected at their forward ends to the arcuate header 30 and the links 20 and 21. The runners 22 and 23 are simultaneously bowed for steering by movement of a steering bar 31 which is connected between a pair of clamping members 32 and 33 which are pivotally connected at their rear ends to the forward end of the center slat of the deck 10. The forward ends of the clamping members 32 and 33 extend forwardly of the steering bar 31 and are pivotally connected to the ends of the steering links 34 and 35, which are pivotally connected at their other ends to the ends of the runners 22 and 23.

The forward knees 36 and 37 are suitably connected at their lower ends to the vertical webs of the runners 22 and 23 respectively. The top portions of the knees 36 and 37 are connected respectively to ends of the segments 15 and 16 of the articulated forward cross-bolster by the long rivets 38 and the short rivets 39. The long rivets 38, as shown in Fig. 3, also connect the side rails and steel links with the bolster segments and with the top of the knees, while the short rivets 39 merely connect the bolster segments and the knees. As shown in Fig. 2, the ends of the short rivets 39 extend through arcuate slots 40 provided in the top portions of the knees 36 and 37.

The adjacent spaced ends of the segments 15 and 16 of the articulated forward cross-bolster are pivotally connected with the link 17 which permits relative movement of the ends in opposite directions. Since the entire articulated forward bolster is not connected with the slats 11 forming the sled deck 10, this movement of the segments 15 and 16 is a free movement.

Upon movement of the steering bar 31 to the dotted line position as shown in Fig. 2, the steering links 34 and 35 are moved to their dotted line positions as here shown. This flexes the ends of the runners 22 and 23 as shown in the dotted line. The arcuate header 30 is moved bodily as indicated by the dotted lines and maintains the front ends of the runners 22 and 23 in spaced parallel alignment. The flexing of the runners 22 and 23 exerts a force on the forward knees 36 and 37 which causes them to move bodily with the runners and relative to the deck 10. This movement is permitted by pivotal movement of the segments 15 and 16 of the articulated forward bolster around the long rivets 38 as the pivot points. The arcuate slots 40 permit this pivotal movement relative to the short rivets 39. This permits flexing of the runners 22 and 23 from points forward of the rear knees 25 and 26 and this permits steering of the sled with less effort than is the case where the only portions of the runners which are permitted to bow are those portions forward of the forward knees.

The coasting sled as herein disclosed is particularly novel in the provision of the articulated segmental forward cross-bolster which acts as a cross tie and brace for the forward sled knees and a support for the sled deck. Its articulated construction allows bodily pivotal movement of the forward knees to facilitate steering of the sled by bowing the runners through a longer arc than is permitted by conventional constructions in which a single rigid member comprises the forward cross-bolster. The novel construction provided by the present invention thus permits ready steering of the sled with less effort than is required to similarly steer a sled having a conventional forward bolster construction.

I claim:

1. A sled construction comprising a rigid frame, sled knees connected at their tops to said frame along each side thereof and at their bottoms to one of a pair of flexible runners disposed along each side of the sled, a pair of transverse aligned segments disposed in the forward portion of the sled which are pivotally attached at their outer ends to the sides of said rigid frame and which are pivotally connected at their inner ends by a link which is free of said frame, and steering means adapted to transversely move the forward ends of said runners to effect steering of the sled by bowing the forward portions of said runners and pivoting the segments about their pivotal axes on the frame.

2. A sled construction including a rigid deck, a pair of side rails disposed one along each side of said deck, a rear cross bolster disposed transversely across thes bottom of aid deck and affixed thereto, a pair of rear knees secured respectively to each end of said rear cross bolster, a forward cross bolster disposed transversely beneath said deck forward of said rear cross bolster, said forward bolster consisting of a pair of segments which are free of said deck and which are pivotally attached at their outer ends to the said side rails and pivotally connected at their inner ends by a link which is also free of said deck, a pair of forward knees secured at their top portions to said side rails and having slots in said top portion, a pair of flexible runners affixed to the bottoms of said forward and rear knees, a rivet connected to each of said segments which extends downward therefrom through the guide slot in the forward knee adjacent said segment, and steering means connected with the forward ends of said runners to effect steering of said sled by transversely bowing the portions of the runners forward of the rear cross bolster and pivoting said forward knees about their pivot axes.

3. A sled including a rigid deck, a pair of side rails disposed one along each side of said deck, a rear cross bolster disposed transversely across the bottom of said deck and affixed thereto, a forward cross bolster disposed transversely beneath said deck forward of said rear cross bolster, said forward bolster consisting of a pair of segments which are free of said deck and which are pivotally attached at their outer ends to the said side rails and pivotally connected at their inner ends by a link which is also free of said deck, a plurality of knees each of which is secured at its top to the outer end of a cross bolster and each of which has a guide slot formed in its top portion, a pair of flexible runners disposed one along each side of the sled and affixed to the bottoms of said knees, a rivet connected to each of said segments which extends through the guide slot in the knee adjacent said segment, a rivet near each end of said rear cross bolster which extends through the guide slot in the knee adjacent the end of said rear cross bolster, and steering means connected with the forward ends of said runners to effect steering of said sled by transversely bowing the portions of the runners forward of the rear cross bolster.

MAX A. HOLBROOK.

REFERENCES CITED

The following references are of record in the file of this patent:

UNITED STATES PATENTS

| Number | Name | Date |
|---|---|---|
| 1,051,614 | Minish | Jan. 28, 1913 |
| 1,905,642 | Kidder | Apr. 25, 1933 |
| 2,006,328 | Scholtes | June 25, 1935 |
| 2,199,680 | Sherwood | May 7, 1940 |
| 2,243,345 | Kidder | May 27, 1941 |
| 2,289,426 | Holbrook | July 14, 1942 |